March 8, 1927.  G. FORNACA  1,620,093
DEVICE FOR PREVENTING ABNORMAL FLEXURE OF THE SPRINGS OF MOTOR VEHICLES
Filed Dec. 5, 1924
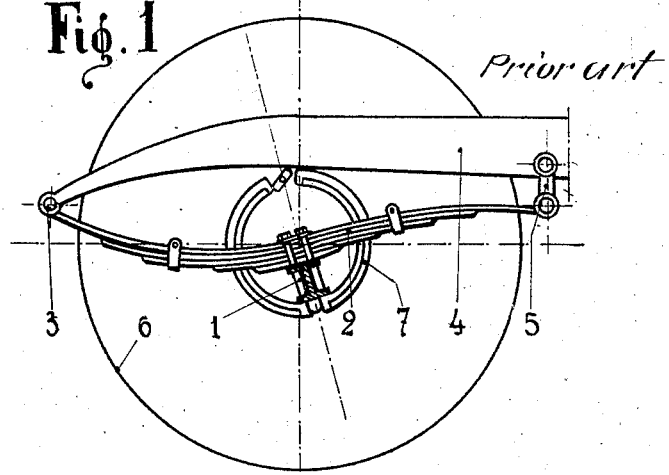
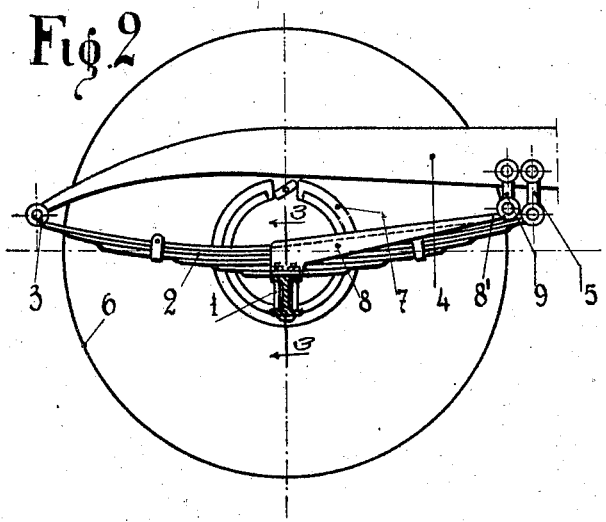
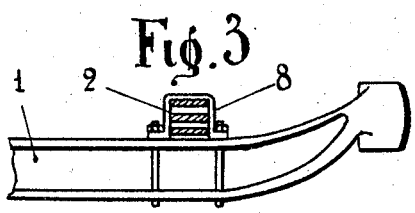
Inventor,
Guido Fornaca
By Kenyon
Atty Patented Mar. 8, 1927.

1,620,093

UNITED STATES PATENT OFFICE.

GUIDO FORNACA, OF TURIN, ITALY.

DEVICE FOR PREVENTING ABNORMAL FLEXURE OF THE SPRINGS OF MOTOR VEHICLES.

Application filed December 5, 1924, Serial No. 754,189, and in Italy December 6, 1923.

It is known that in motor vehicles provided with brakes on the front wheels deformations and fractures of the front suspension springs often occur due to the fact that when the brake is in action, the axle tends to follow the wheels in their revolutions and this movement is prevented solely by the resistance of the springs themselves, which are thus subjected to excessive stresses.

In addition to this inconvenience, the regularity of the elastic action of the suspension during braking is endangered for the same reason.

Devices in the form of strut rods or torque rods connected to the axle and with the chassis of the vehicle have, however, been proposed which eliminate movements of twist of the axle and abnormal flexure of the springs.

The present invention provides an improved device of this character, particularly adapted for motor vehicles having brakes on the front wheels, which consists of a rigid stay provided at one of its ends with a stirrup serving to secure the spring to the axle and adapted to be connected at its other end with the chassis. Preferably the stay is connected with the chassis by means of a link.

The accompanying drawings show diagrammatically and by way of example the application of the device to the front wheel of a motor car.

Fig. 1 shows with some exaggeration the abnormal flexure of an ordinary spring during braking.

Fig. 2 shows the application of the device.

Fig. 3 is a section on line 3—3 of Fig. 2.

In all the figures, 1 indicates the front axle to which is fixed at each side of the vehicle, a semi-elliptical spring 2, the ends of which are attached to the spring carrier arm 3 of the chassis 4 and to the suspension shackle 5, respectively, 6 indicates one of the front wheels each of which is furnished with a brake 7.

When the brake is in operation, the active force of the vehicle tending to keep the wheel in rotation operates in such a manner that the wheel transmits a strong moment of torsion to the axle which, in its turn, transmits it to the spring. The spring, being unable to resist, is caused to buckle as shown in Fig. 1, and this deformation may exceed the limit of the elastic resistance of the spring thereby becoming permanent or causing fracture. Even if deformation or fracture does not occur immediately, it is evident that the frequency of abnormal stresses will, in time, result in weakening the spring and deforming it permanently.

To eliminate this inconvenience a stay 8 (Figs. 2 and 3) is formed with lateral flanges which partially embrace or cover the spring and is either fixed to the axle 1 in correspondence with the usual stirrup or equivalent for attaching the spring or replaces said stirrup or equivalent. The extremity 8′ of the stay is provided with an eye, analogous to that of the spring, and is connected to the chassis 4 by means of a shackle 9, which renders the extension movements of the spring independent of those of the stay.

Further, the constructional details of the stay and the means of its attachment may vary according to practical requirements without departing from the scope of the invention.

What I claim is:

1. A strut for vehicle springs consisting of a rigid member having side flanges and terminating in an end portion forming a stirrup adapted to secure the spring to the axle of the vehicle.

2. A strut for vehicle springs comprising a rigid member substantially U-shaped in cross section and forming a stirrup at one end adapted to embrace a spring and capable of clamping the latter to the vehicle axle, and means for connecting the other end of the strut to the chassis of the vehicle.

3. The combination of a vehicle chassis, a spring connected thereto, a strut comprising a rigid member substantially U-shaped in cross-section forming a stirrup at one end adapted to embrace the spring and operating to clamp the spring to the vehicle axle, and means to pivotally connect the opposite end of the strut to the chassis.

4. The combination of a vehicle chassis, a semi-elliptic spring connected at its ends to the chassis, a strut comprising a rigid tapering member substantially U-shape in cross section, one end of the strut embracing the spring and clamped to the vehicle axle, and a shackle pivotally connecting the other end of the strut to said chassis.

In testimony that I claim the foregoing as my invention, I have signed my name.

GUIDO FORNACA.